United States Patent [19]

Christian et al.

[11] Patent Number: 5,307,279

[45] Date of Patent: Apr. 26, 1994

[54] SELF DIAGNOSTIC WHEEL BALANCER

[75] Inventors: Donald J. Christian, Fremont, Calif.; Steven W. Rogers, Maumelle, Ark.

[73] Assignee: FMC Corporation, Chicago, Ill.

[21] Appl. No.: 763,042

[22] Filed: Sep. 20, 1991

[51] Int. Cl.⁵ .......................................... G01M 17/02
[52] U.S. Cl. .................................. 364/463; 364/506; 364/551.01; 73/462
[58] Field of Search .............. 364/463, 506, 508, 575, 364/551.01; 73/460, 462

[56] References Cited

U.S. PATENT DOCUMENTS

| | | | |
|---|---|---|---|
| 4,144,578 | 3/1979 | Mueller et al. | 364/575 |
| 4,201,091 | 5/1980 | Guyot et al. | 73/462 |
| 4,338,818 | 7/1982 | Hill et al. | 73/462 |
| 4,450,529 | 5/1984 | Hill et al. | 364/508 |
| 4,805,125 | 2/1989 | Beebe | 73/462 |

Primary Examiner—Thomas G. Black
Assistant Examiner—Michael Zawelli
Attorney, Agent, or Firm—Michael Lee; R. C. Kamp; R. B. Megley

[57] ABSTRACT

The invention provides a wheel balancer that is able to determine if its measurements are accurate. The invention takes a set of measurements and determines if the measurements are sufficiently consistent. If they are sufficiently close the invention uses the measurements to calculate wheel imbalance. If the measurements are not sufficiently close the invention uses the measurements to calculate wheel imbalance. If the measurements are not sufficiently close the invention rejects at least one data point and collects more measurements until either the invention yields sufficiently close data points or the machine is stopped. A display is provided for diagnostic messages.

18 Claims, 8 Drawing Sheets

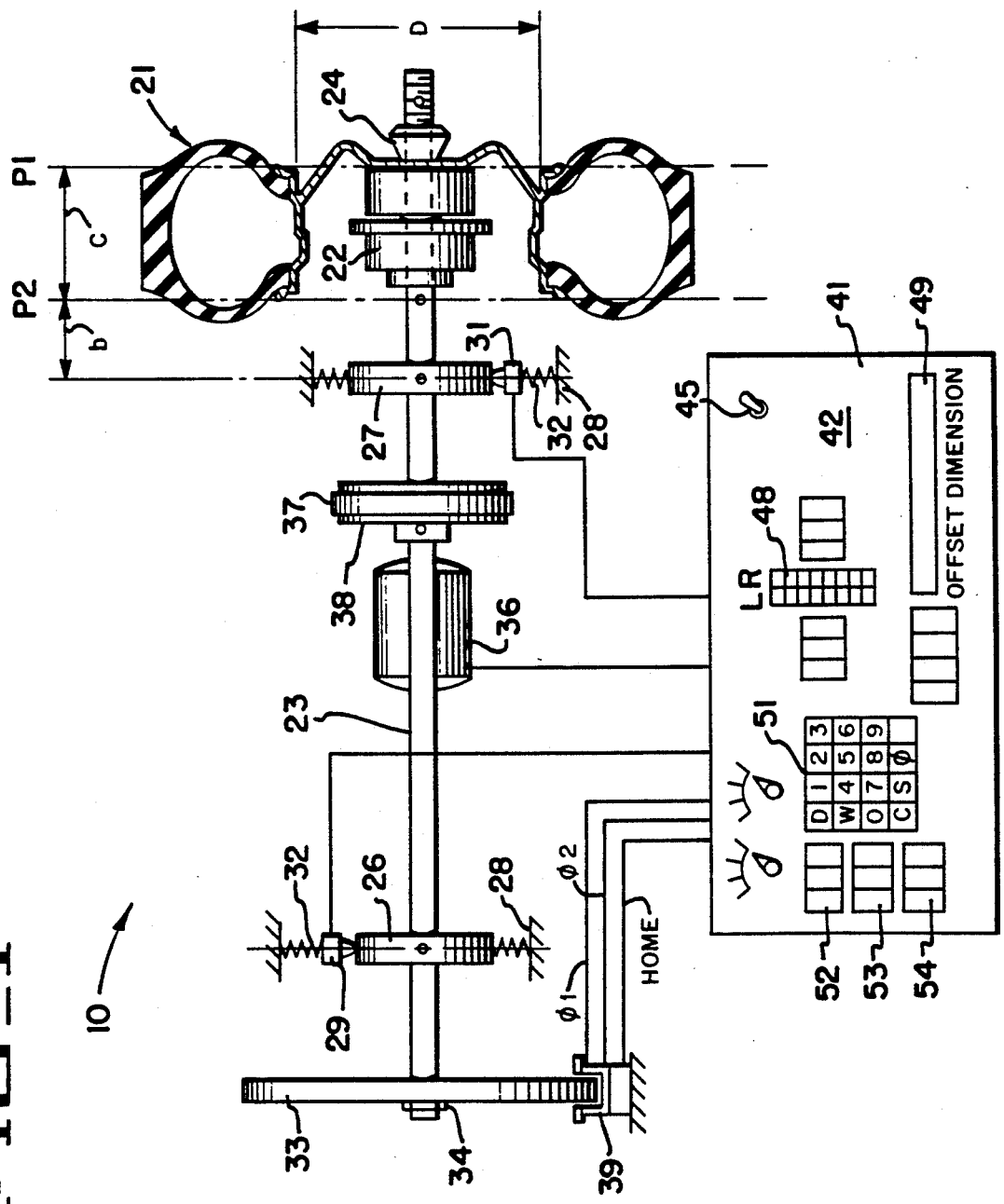
FIG_1

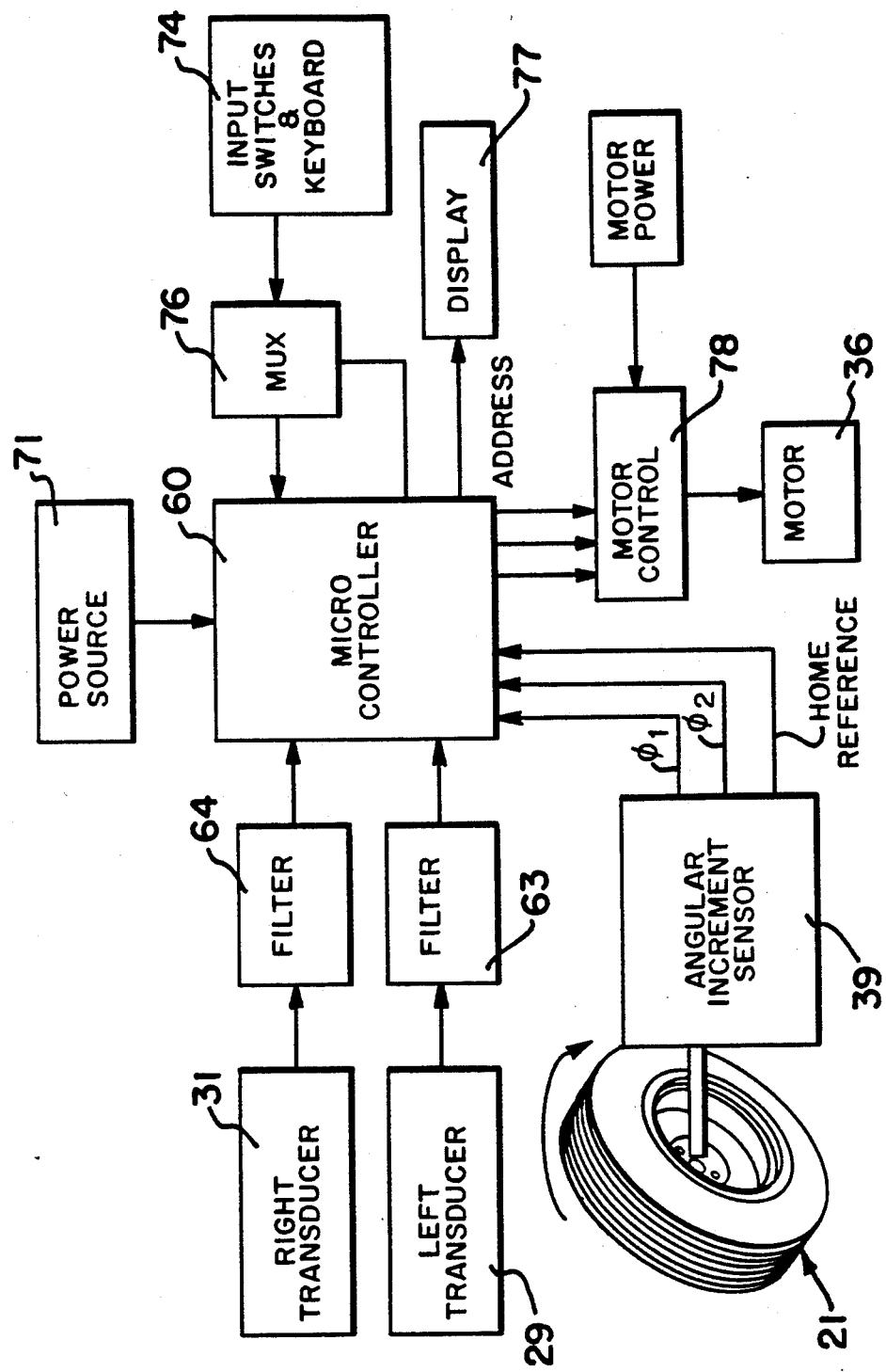

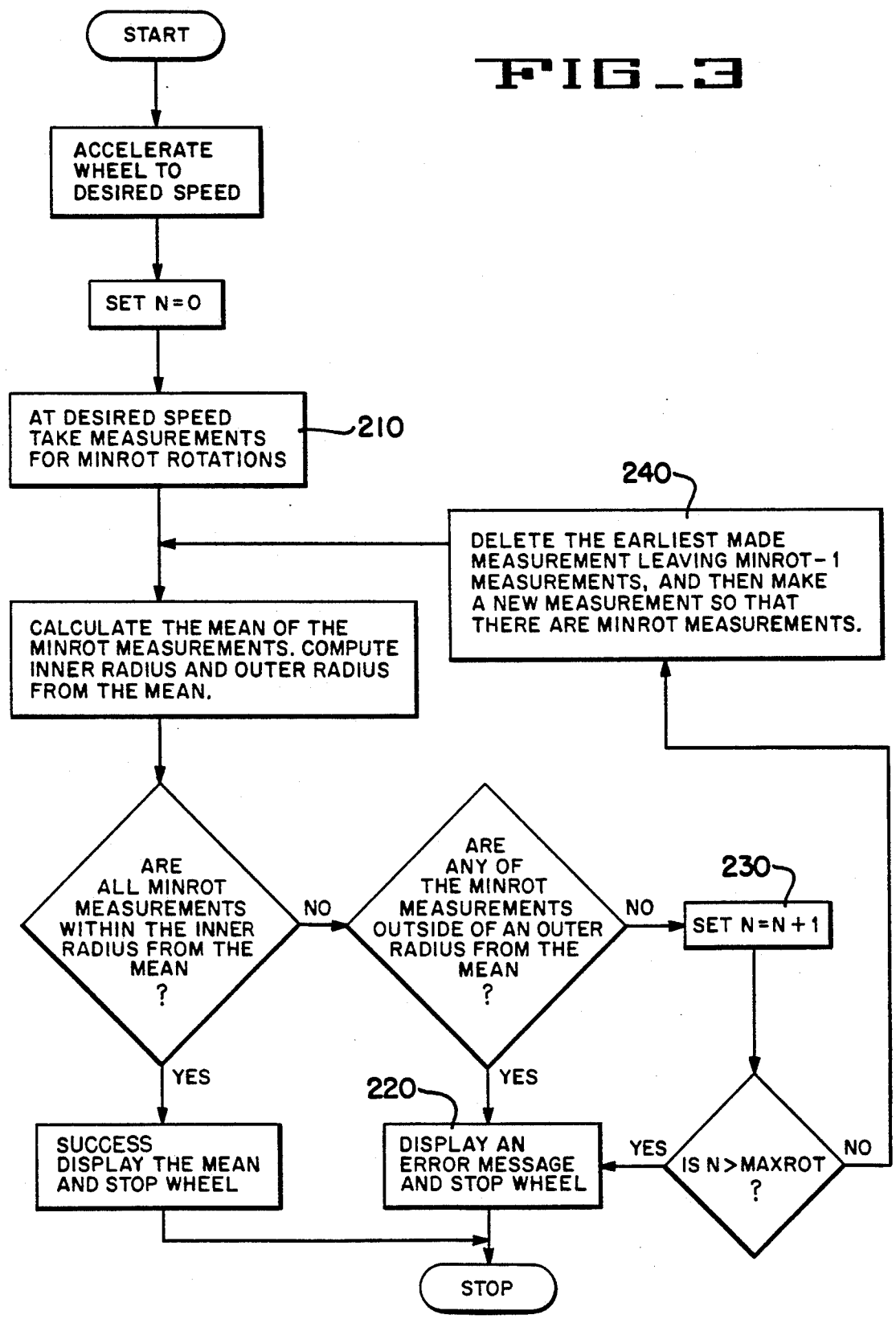

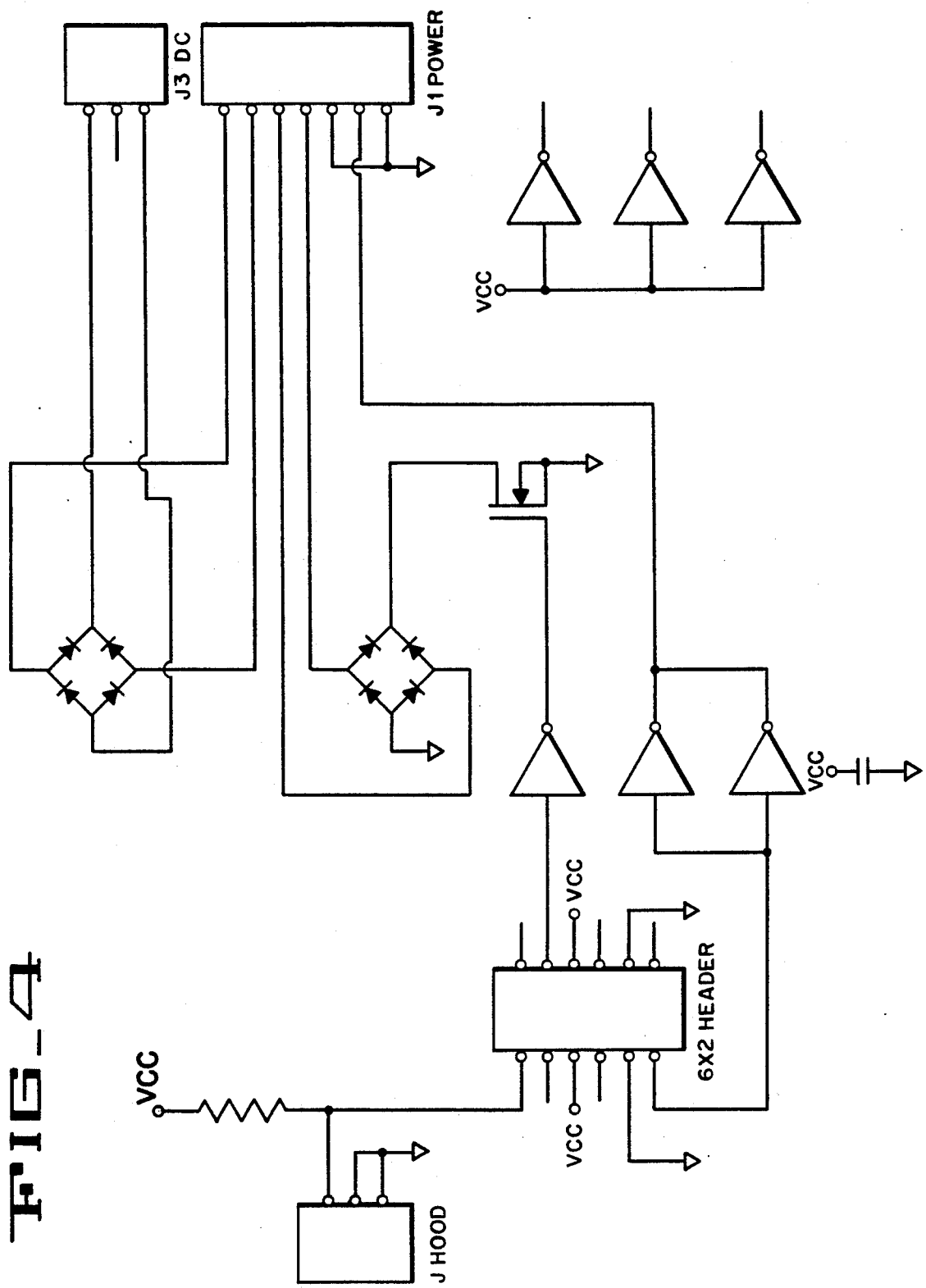
FIG_4

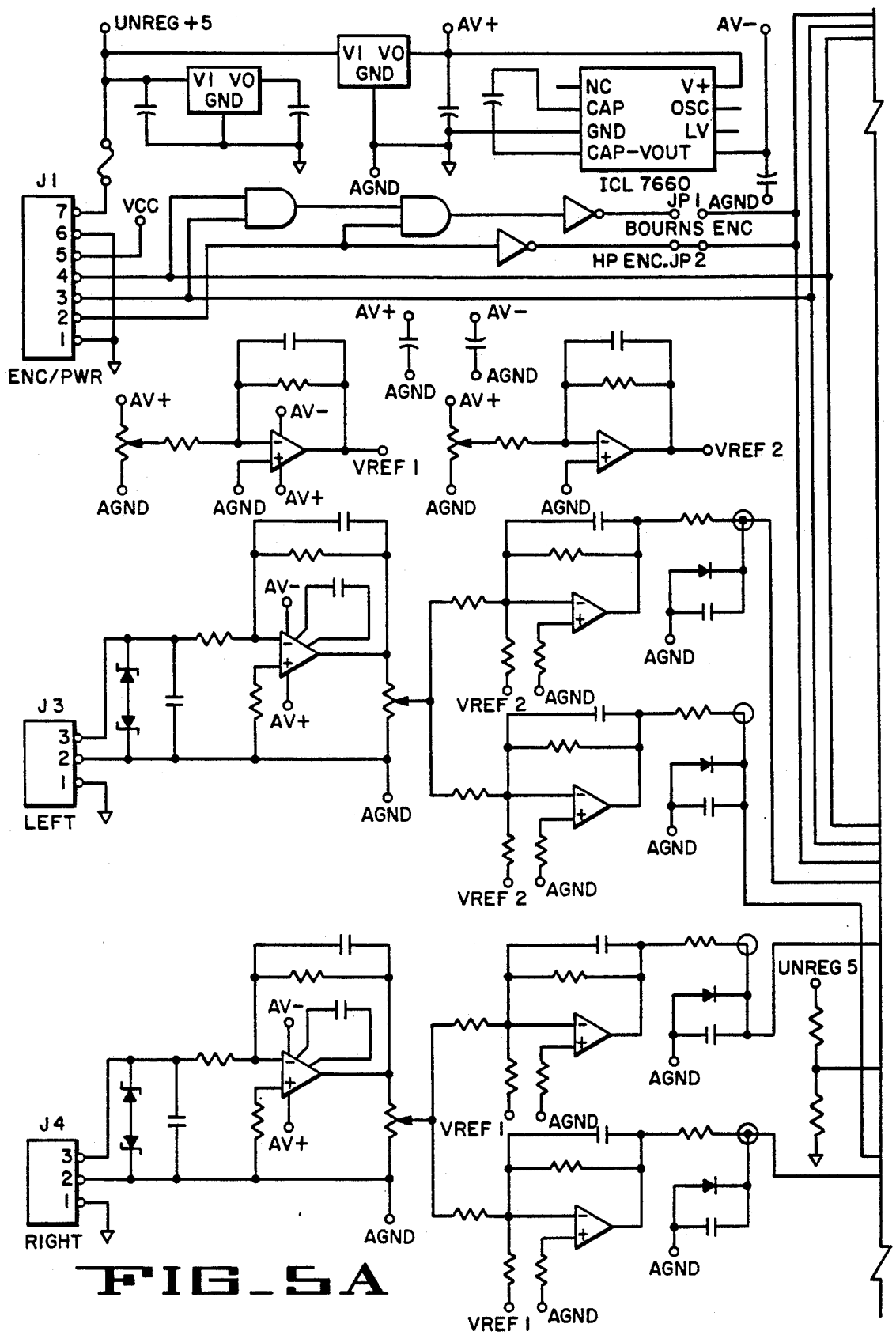
FIG_5A

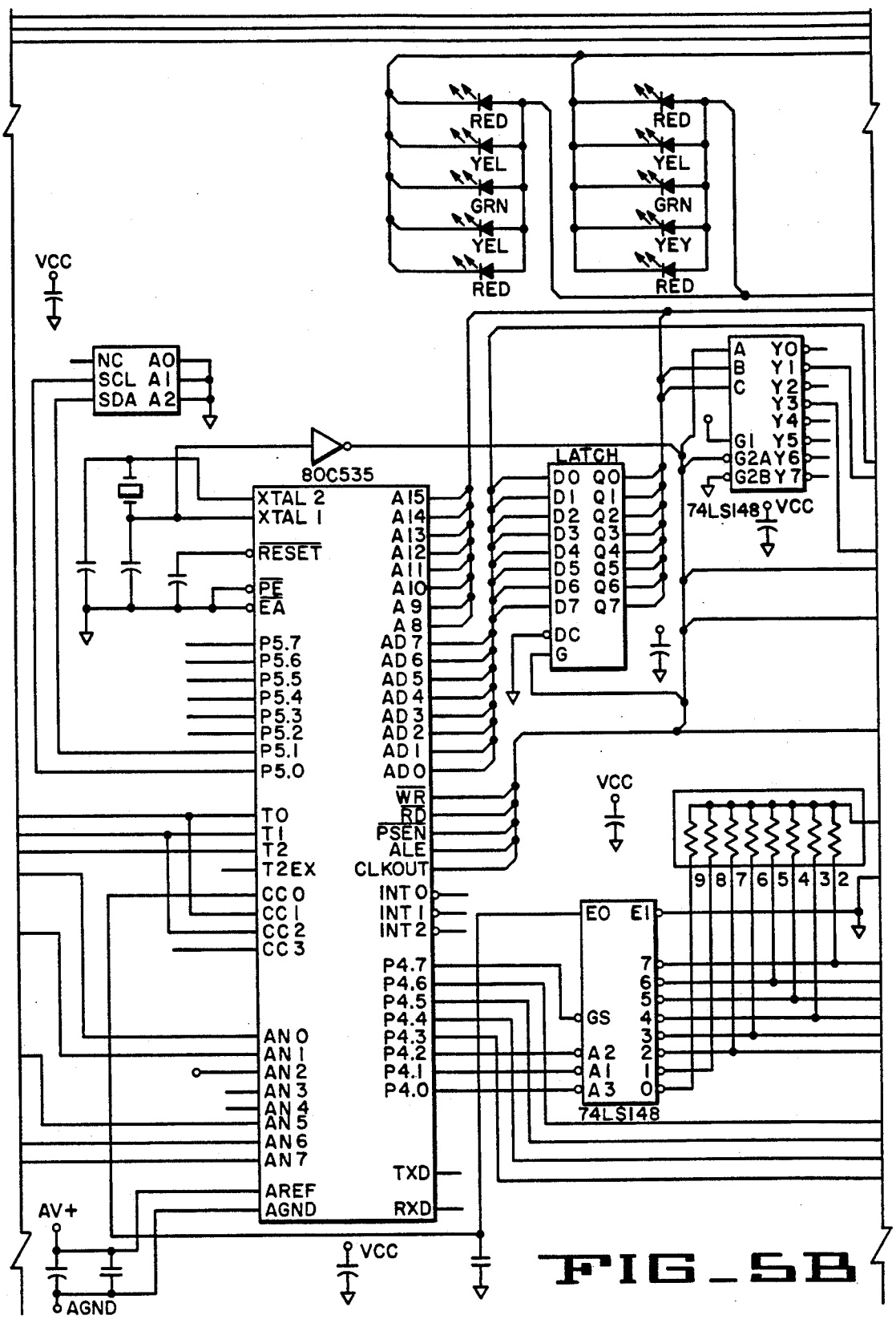
FIG_5B

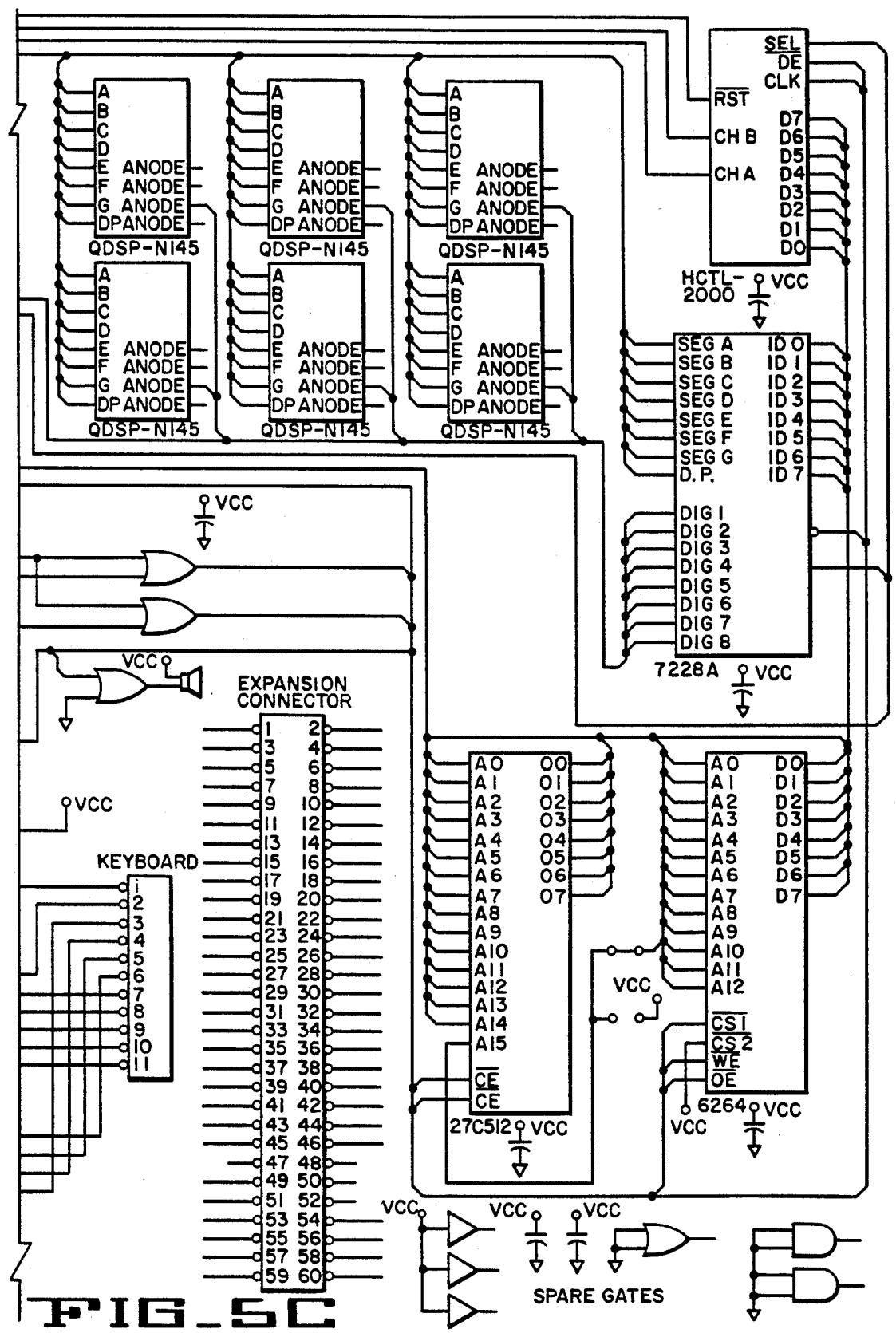
FIG_5C

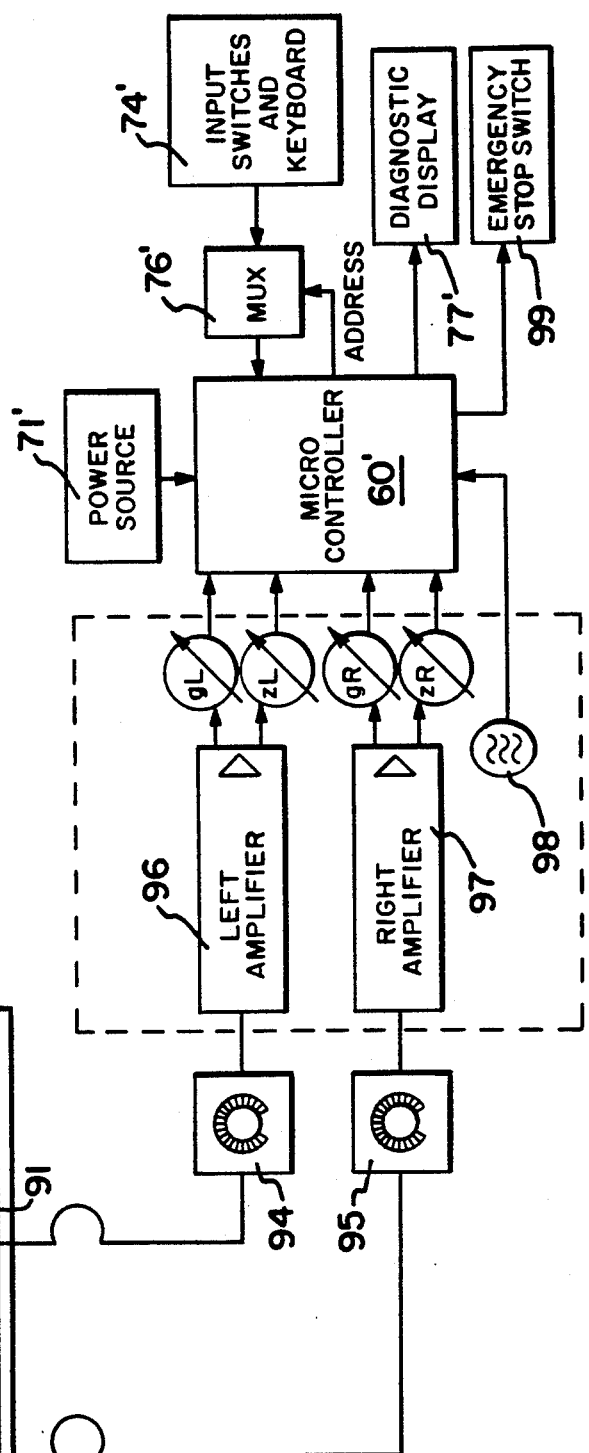
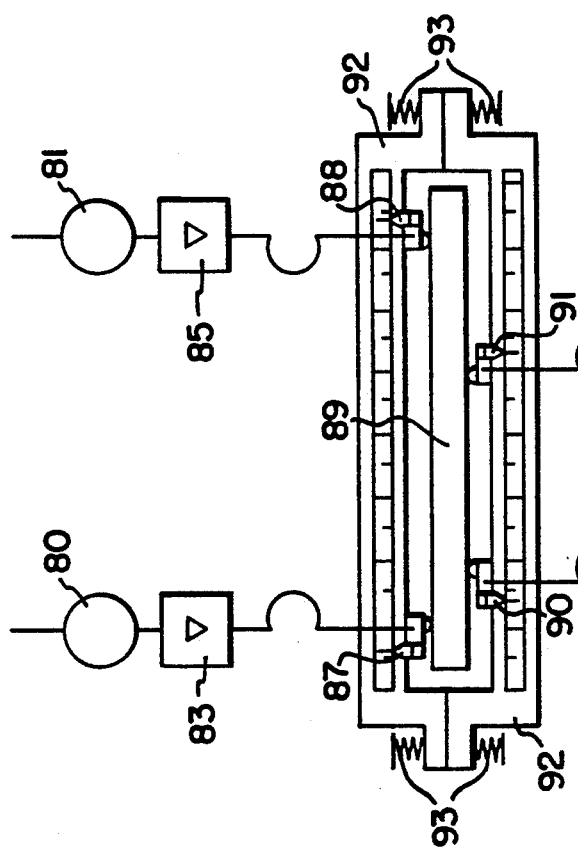
FIG_6

SELF DIAGNOSTIC WHEEL BALANCER

BACKGROUND OF THE INVENTION

Wheel balancers use a display to indicate to an operator the position and amount of counterbalancing weights. These readings are typically displayed on a set of indicators or gauges. Early balancers indicated the readings continuously while the wheel was spinning. A skilled mechanic can read a continuous display of this type and not only determine the unbalance but also diagnose certain types of problems, such as: loose wheel, water inside the tire, bearing or machine fault, etc. The disadvantage of a continuous display is that novice (unskilled) users sometimes find it difficult to read and are confused by normal fluctuations. To avoid these problems, virtually all modern computerized balancers use a "sample-and-hold" technique that stabilizes the display. The drawback is that a stable display precludes problem detection and diagnosis.

It is an object of the invention to provide a balancer which automatically detects any deviation from its own optimum performance and in addition detects dynamic instabilities in the wheel.

Another object of the invention is to provide a wheel balancer which provides an accurate measurement with a minimal number of wheel rotations.

SUMMARY OF THE INVENTION

The invention provides a method and apparatus for taking measurements from a small number of rotations of the wheel to be balanced, determining a combined output measurement, determining if the variation of the measurements lie within a predetermined limit, taking additional sample points if the variation of the measurements do not lie within a second limit until the variation of the measurements lie within the limit, determining a combined output measurement, and stopping the operation whenever the variation in measurements exceeds a second limit.

BRIEF DESCRIPTION OF THE DRAWINGS

FIG. 1 illustrates a sectional view of a hard mount wheel balancer which utilizes the invention.

FIG. 2 is a schematic illustration of the electrical system of the invention used in the embodiment illustrated in FIG. 1.

FIG. 3 illustrates a flow diagram of the procedure used in the embodiment of the invention illustrated in FIGS. 1 and 2.

FIG. 4 is a schematic diagram of part of an electrical system which can be used in the apparatus illustrated in FIGS. 1 and 2 to carry out the procedure illustrated in FIG. 3.

FIGS. 5A, B and C when placed next to each other form a schematic diagram of part of an electrical system which can be used in the apparatus illustrated in FIGS. 1 and 2 to carry out the procedure illustrated in FIG. 3.

FIG. 6 is a schematic illustration of the electrical system of the invention used on another embodiment of the invention.

DESCRIPTION OF THE PREFERRED EMBODIMENTS

One embodiment of the invention is used on a hard mount wheel balancer 10 illustrated in FIG. 1.

As shown in FIG. 1, an automobile rim and tire combination (wheel assembly) 21 is shown as the rotating body securely mounted against a shoulder member 22 which is attached to the end of a rotating shaft 23. The rim portion of the wheel assembly 21 has the usual centrally disposed hole which fits over the end of the shaft 23. The rim is held tightly in place by a wheel clamp 24 which engages threads formed on the end of the shaft 23. A pair of bearing housings 26 and 27 are resiliently supported within a fixed, rigid framework 28. The shaft 23 is supported on inner bearing members within the bearing housings 26 and 27, thereby being disposed for rotational motion within the framework 28. Left and right force transducers 29 and 31, respectively, are positioned between the framework 28 and bearing housings 26 and 27. Resilient springs 32 are positioned between each of the force transducers and the framework to maintain the force transducers 29 and 31 in continuous contact with the bearing housings 26 and 27.

An encoder disc 33 is secured to the end of the shaft 23 opposite the end carrying the rim and tire combination 21 by means of a nut 34 and therefore rotates with the shaft 23. A motor 36 is mounted on the framework 28 functioning to drive the shaft 23 rotationally through a belt 37 and a pulley 38 which is fixedly mounted on the shaft 23. The pulley 38 can be mounted at various places such as between the bearing housings 26 and 27 as shown or between a bearing housing 26 and the encoder disc 33.

A photosensor and light source assembly 39 is mounted on the framework 28 adjacent to the edge of the encoder disc 33. Signals provided by the photosensor and light source assembly 39 are connected to the circuitry contained within a console 41 having a front panel 42 thereon. The signals provided by the photosensor and light source assembly are three in number, with the signals being labeled in FIG. 1 as f1, f2, and "home" or reference. Force transducers 29 and 31 are also connected to the electronic circuitry contained in the console 41 as is the motor 36. The mechanical arrangement of the wheel unbalance measuring device as disclosed herein to this point may be of the type described in U.S. Pat. No. 4,046,017 issued to Hill.

On display panel 42 is a start/spin switch 45 which initiates a shaft spin routine. Left and right position indicators 48 provide angular information indicative of where weights should be attached at the rim of the wheel assembly 21 to counterbalance the measured unbalance mass. An offset dimension measurement gauge 49 is provided on the front panel 42 from which a convenient reading of the axial position of the wheel assembly 21 on the shaft 23 can be obtained. Wheel assembly 21 physical parameters are entered into the system by means of a four-by-four keyboard 51. The offset dimension is entered by selecting the "O" in the first column, third row on the keyboard and the appropriate offset measurement by means of the numbered keys. The offset is represented in FIG. 1 by the letter "b". In like manner the diameter D of the rim in the rim and tire assembly 21 is entered into the system by selecting the key shown as "D" and the appropriate diameter dimension on the numbered keys. The width of the rim and tire assembly 21 is taken between the two planes, seen as P1 and P2 in FIG. 1, at which counter balancing weights may be applied to the rims. Wheel width is represented in the diagram by the letter "c". The width is entered into the system by selecting the key marked "W" on the keyboard 51 together with the appropriate numbered keys. The selected diameter, width, and offset values are displayed in the three place displays 52, 53, and 54, respectively. The panel 42 also has an error display 55 for an error message.

FIG. 2 illustrates a schematic diagram of the electrical system of the embodiment of the invention illustrated in FIG. 1. Signals from the right transducer 31 are fed as input to a first filter 64 which feeds as output a signal to a micro-controller 60. Signals from the left transducer 29 are fed as input to a second filter 63, which feeds as output a signal to the micro-controller 60. The micro-controller 60 is powered by a power source 71. The input switches and keyboard 74 are electrically connected to a multiplexer 76 which provides input to the micro-controller 60. The micro-controller 60 provides feedback to the multiplexer 76. The micro-controller 60 provides control signals to the display 77 and the motor control 78, which controls the motor 36.

FIG. 3 is a schematic illustration of the operation of the embodiment of the invention illustrated in FIGS. 1 and 2. As described above the keyboard 74 is used to input the offset, the wheel width, and the wheel diameter into the micro-controller 60 and to tell the micro-controller 60 to start the motor 36. The motor 36 begins to rotate the wheel assembly 21 until the wheel assembly 21 reaches a desired rotational speed 210. The angular increment sensor 39 sends information regarding the angle of the wheel assembly 21 to the micro-controller 60, which determines the time it takes for the wheel assembly 21 to make a complete rotation $T_T$. Using the time it takes for the wheel assembly 21 to make a complete rotation $T_T$, the micro-controller 60 calculates the instantaneous angular velocity $w_T$ using the equation $w_T = 1/T_T$. The voltage Vr produced by the right transducer 31 is fed through the first filter 64 to the micro-controller 60. The voltage Vl produced by the left transducer 29 is fed through the second filter 63 to the micro-controller 60. The force on the left transducer $Fl = (Kl)(Vl)$, where Kl is a constant, characteristic of the left transducer 29. The voltage Vr produced by the right transducer 31 is fed through the first filter 64 to the micro-controller 60. The force on the right transducer $Fr = (Kr)(Vr)$, where Kr is a constant, characteristic of the right transducer 31. From these values for each rotation a left weight vector Wl and a right weight vector Wr are calculated using the equations:

$$Wl = 2(Fl)g/(w_T^2 D) \text{ and } Wr = 2(Fr)g/(w_T^2 D),$$

where g is the gravitational constant.

Two values MINROT and MAXROT are set in the system. In this embodiment MINROT = 5 and MAXROT = 30. N is set initially to zero. After the wheel assembly 21 reaches a desired rotational speed Wl and Wr are collected for five rotations, creating a seed set of five pairs of Wl and Wr. In this embodiment, averaging is used to calculate the mean. The Wl's are averaged together to get $Wl_{ave}$, and the Wr's are averaged together to get $Wr_{ave}$. INNER RADIUS and OUTER RADIUS are set in proportion to the magnitude of $Wl_{ave}$ and $Wr_{ave}$. For each pair of the five data a distance is calculated using the equation:

$$D = [(Wl_{ave} - Wl)^2 + (Wr_{ave} - Wr)^2]^{\frac{1}{2}},$$

If the distance D for all pairs of data is less than the INNER RADIUS, $Wl_{ave}$ and $Wr_{ave}$ are used as imbalance values and the information to balance the wheel assembly is displayed and the rotation of the wheel assembly 21 is stopped by using the motor as a brake. If a distance D for any of the pairs of data is greater than the OUTER RADIUS, then the rotation of the wheel assembly 21 is stopped and an error message is displayed 220. If none of the distances D for all of the pairs of data are greater than the OUTER RADIUS and at least one of the distances D of a pair of data is greater than the INNER RADIUS, then N is set to N+1 230 and if N is less than or equal to MAXROT the earliest made pair of data is deleted and a new pair of data is measured, then the procedure is repeated beginning from the step of calculating $Wl_{ave}$ and $Wr_{ave}$. If N > MAXROT than an error message is displayed and the rotation of the wheel assembly is stopped using the motor as a brake 220.

The invention provides a means to determine if errors are being introduced by bearing wear, or fluids in the tire, or improper mounting of the wheel assembly. Such greater would cause pairs of data with distances consistently greater than the inner radius or in drastic cases greater than the outer radius. The constant determination of such errors will stop the rotation of the wheel assembly and signal to the operator that a problem exists, which is causing inaccurate measurements. For temporary errors such as a person or tool accidentally bumping the apparatus, the invention determines that a data pair is in error and selects a new data pair. If the error is temporary such as the bumping of the apparatus, then the elimination of the data in error and the addition of new data will allow the invention to provide an accurate measurement in such conditions.

FIG. 4 is a schematic diagram of a part of an electrical system. FIGS. 5A,B,C when placed next to each other form a schematic diagram of part of an electrical system. Together FIGS. 4 and 5A,B,C form an electrical system which may be used to implement the procedure in FIG. 3 on a wheel balancer as shown in FIGS. 1 and 2.

In alternative embodiments of the invention, the bearing housings 26 and 27 may use an elastomeric seal on an inner rotating ring to provide protection to the bearing. In the alternative, the elastomeric seal can be replaced with a metallic non-contacting shield which reduces drag caused by the seal, but also reduces bearing protection. In addition an embodiment of the invention may provide a retained bearing to hold the shaft in place and a "floating" bearing allowing an easier alignment of the bearing races. The floating bearing is accomplished by honing the support for the floating bearing in a bearing tube and lubricating this region. The invention may be used in an all electronic wheel balancer with rotational wheel speeds up to 700 rpm.

The above described embodiment uses the invention on a hard mount wheel balancer. Other embodiments of the invention could be used on a soft mount wheel balancer. While the above described embodiment uses data pairs from five rotations, data pair from any number of rotations greater than two could be used. Other statistical measures may also be used, such as the standard deviation of a series of data pairs.

FIG. 6 illustrates an electrical schematic of the invention used on a balancer described in U.S. Pat. No. 3,902,373 to Wolf-Dieter Reutlinger incorporated by reference. The balancer utilized is illustrated in FIG. 3 of U.S. Pat. No. 3,902,373, with modifications. As described in U.S. Pat. No. 3,902,373 diaphragms 80 and 81 are made integral with bearing stands. The output signals from the two force-measuring diaphragms 80 and 81 are amplified in amplifiers 83 and 85 and led through reversible alternator force exciters 87 and 88 to develop alternating forces on a beam 89. The beam 89 is supported by or on force-measuring diaphragms or sensors 90 and 91. The beam 89 as well as the exciters 87 and 88 and diaphragms 90 and 91 are included in a framing 92 held by elastic means. This framing 92 is made up of two parts for the purpose of easily adjusting or setting the alternating force producer and force measuring means. The two parts are urged together by means of tensioning springs 93. The output electrical signals from the force measuring diaphragms 90 and 91 are led to radius controls 94 and 95 at which the radius on the rotor for attachment of weights for the balancing out is set. The signals from the radius controllers 94 and 95 are fed to a left amplifier 96, which generates signals gL and zL, and a right amplifier 97, which generates signals gR and zR. These signals and a signal created by a phase generator 98 are fed into an electrical system similar to the electrical system in FIG. 2. Similar components between the electrical systems in FIG. 2 and FIG. 3 will be similarly numbered. The signals are fed to a micro-controller 60'. The micro-controller 60' is powered by a power source 71' and receives input from and provides output to a multiplexer 76' which also receives input from input switches and a keyboard 74'. The micro-controller 60' provides output to a diagnostic display 77' and an emergency stop switch 99. The micro-controller 60' processes the signals in a similar manner as described in the previous embodiment.

While preferred embodiments of the present invention have been shown and described herein, it will be appreciated that various changes and modifications may be made therein without departing from the spirit of the invention as defined by the scope of the appended claims.

What is claimed is:

1. A self diagnostic wheel balancer for use in balancing a wheel, comprising:
   means for rotating the wheel;
   means for collecting a set of imbalance measurements with the set comprising at least one imbalance measurement per rotation in a set of at least two rotations;
   means for continuously eliminating a value in the set of imbalance measurements and adding a new imbalance measurement to the set of imbalance measurements until any one of the following events is accomplished: the set of imbalance measurements are sufficiently consistent, the set of imbalance measurements are sufficiently inconsistent, and an upper limit of imbalance measurements is reached; and
   means for displaying a number derived from the set of imbalance measurements indicating how to balance the wheel.

2. The self diagnostic wheel balancer, as claimed in claim 1, wherein the means for continuously eliminating a value in the set of imbalance measurements, comprises:
   means for computing the mean value of the set of imbalance measurements; and
   means for determining if any of the imbalance measurements are outside of a first distance from the mean of the set of imbalance measurements.

3. The self diagnostic wheel balancer, as claimed in claim 2, further comprising:
   means for determining if any of the imbalance measurements are outside of a second distance, which is greater than the first distance from the mean of the set of imbalance measurements; and
   means for displaying an error signal if any of the imbalance measurements is outside the second distance from the means of the set imbalance measurements.

4. The self diagnostic wheel balancer, as claimed in claim 3, further comprising:
   means for counting the total number of imbalance measurements taken; and
   means for displaying an error signal if the total number of imbalance measurements is greater than a set value.

5. The self diagnostic wheel balancer, as claimed in claim 4, wherein the means for computing the mean value of the set of imbalance measurements comprises, means for averaging the set of imbalance measurements.

6. The self diagnostic wheel balancer, as claimed in claim 4, further comprising, means for stopping the rotating wheel when an error signal is displayed.

7. The self diagnostic wheel balancer, as claimed in claim 1, wherein the means for continuously eliminating a value in the set of imbalance measurements and adding a new imbalance measurement to the set of imbalance measurements, comprises:
   means for removing the earliest measured value from the set of imbalance measurements;
   means for adding a new imbalance measurement to the set of imbalance measurements; and
   means for determining whether the set of imbalance measurements is consistent.

8. The self diagnostic wheel balancer, as claimed in claim 1, further comprising:
   means for counting the total number of imbalance measurements taken; and
   means for displaying an error signal if the total number of imbalance measurements is greater than a set value.

9. The self diagnostic wheel balancer, as claimed in claim 8, wherein the means for continuously eliminating a value in the set of imbalance measurements and adding a new imbalance measurement to the set of imbalance measurements, further comprises:
   means for eliminating the earliest measured value from the set of imbalance measurements;
   means for adding a new imbalance measurement to the set of imbalance measurements; and
   means for determining whether the set of imbalance measurements is consistent.

10. A method of providing a self diagnostic wheel balancer for use in balancing a wheel, comprising the steps of:
    rotating the wheel to a desired speed;
    collecting a set of imbalance measurements wherein the set of imbalance measurements comprises at least one imbalance measurement per rotation in a set of at least two rotations;
    continuously eliminating an imbalance measurement from the set of imbalance measurements and adding a new imbalance measurement to the set of imbalance measurements until any of the following events is accomplished: the entire set of imbalance measurements is within a set distance from each other, and until an upper limit of imbalance measurements is reached; and
    displaying a number derived from the set of imbalance measurements indicating how to correct the imbalance of the wheel.

11. The method, as claimed in claim 10, wherein the step of continuously eliminating an imbalance measurements, comprises the steps of:
   computing the mean value of the set of imbalance measurements; and
   determining whether any of the imbalance measurements are outside of a first distance from the mean of the set of imbalance measurements.

12. The method, as claimed in claim 11, further comprising the steps of:
   determining if any of the imbalance measurements are more than a second distance from the mean; and
   displaying an error signal if any of the imbalance measurements are more than a second distance from the mean.

13. The method, as claimed in claim 12, further comprising the steps of:
   counting the total number of imbalance measurements taken; and
   displaying an error signal if the total number of imbalance measurements taken is greater than a set value.

14. The method, as claimed in claim 13, wherein the step of computing the mean value of the set of imbalance measurements comprises the step of averaging the set of measurements.

15. The method, as claimed in claim 10, wherein the step of continuously eliminating an imbalance measurement, comprises the steps of:
   removing the earliest imbalance measurement from the set of imbalance measurements;
   adding a new imbalance measurement to the set of imbalance measurements; and
   determining whether the set of imbalance measurements is consistent.

16. The method, as claimed in claim 15, further comprising the step of stopping the rotating wheel when an error signal is displayed.

17. The method, as claimed in claim 10, further comprising the steps of:
   counting the total number of imbalance measurements taken; and
   displaying an error signal if the total number of imbalance measurements taken is greater than a set value.

18. The method, as claimed in claim 17, wherein the step of continuously eliminating an imbalance measurement, further comprises the steps of:
   removing the earliest imbalance measurement from the set of imbalance measurements;
   adding a new imbalance measurement to the set of imbalance measurements; and
   determining whether the set of imbalance measurements is consistent.

* * * * *